United States Patent [19]

Shimizu

[11] Patent Number: 4,857,290
[45] Date of Patent: Aug. 15, 1989

[54] PROCESS FOR PRODUCING SILICA OF HIGH PURITY

[75] Inventor: Shumpei Shimizu, Moses Lake, Wash.

[73] Assignee: Moses Lake Industries, Inc., Moses Lake, Wash.

[21] Appl. No.: 229,760

[22] Filed: Aug. 8, 1988

Related U.S. Application Data

[63] Continuation of Ser. No. 55,802, May 27, 1987, abandoned.

[30] Foreign Application Priority Data

Jun. 13, 1986 [JP] Japan ............................. 61-136320

[51] Int. Cl.$^4$ ............................................. C01B 33/12
[52] U.S. Cl. ................................... 423/339; 423/335; 423/338
[58] Field of Search ................ 423/337, 338, 339, 335

[56] References Cited

U.S. PATENT DOCUMENTS

| | | | |
|---|---|---|---|
| 3,857,924 | 12/1974 | Halasz et al. | 423/339 |
| 4,190,632 | 2/1980 | Achenbach et al. | 423/339 |
| 4,327,065 | 4/1982 | von Dardel et al. | 423/338 |
| 4,355,015 | 10/1982 | Heckel et al. | 423/337 |

FOREIGN PATENT DOCUMENTS

| | | | |
|---|---|---|---|
| 1381856 | 5/1964 | France | 423/338 |
| 60-42217 | 3/1985 | Japan . | |
| 1086430 | 5/1986 | Japan | 423/338 |
| 1031901 | 7/1983 | U.S.S.R. | 423/339 |

Primary Examiner—John Doll
Assistant Examiner—Lori S. Freeman
Attorney, Agent, or Firm—Armstrong, Nikaido, Marmelstein, Kubovcik & Murray

[57] ABSTRACT

This invention provides a process for producing silica from silica sol which comprises preparing an acidic silica sol applied with a hydrogen peroxide treatment from an aqueous solution of alkali silicate, purifying the acidic silica sol by using a cationic exchange resin after pH adjustment and preparing silica from the silica sol obtained by neutralizing the thus purified acidic silica sol, that is, a production process for highly pure silica capable of removing, Ti as much as possible in the same manner as impurities such as Fe and Al.

12 Claims, No Drawings

PROCESS FOR PRODUCING SILICA OF HIGH PURITY

This application is a continuation of application Ser. No. 055,802 filed May 27, 1987 now abandoned.

BACKGROUND OF THE INVENTION

1. Field of the Invention

This invention concerns a process for producing synthetic silica of high purity and it particularly relates to an improvement in the process for producing highly pure silica not containing Ti.

2. Description of the Prior Art

Heretofore, silica has been utilized in a wide range of application uses as fillers in resin compositions for sealing electronic components and raw materials for multi-ingredient optical fibers, fine ceramics, optical glasses, quartz for use in electronic industry, etc.

Particularly, in the case of sealing silica used as filler in resin compositions for sealing electronic components, there is a problem of misoperation referred to as soft errors caused by elements and compounds such as uranium (U) and like other α-emitters as the density of integration is increased in LSI, SLSI, etc., accordingly, it is required that the content of the α-emitter material is kept as low as possible.

Further, there exists a demand for highly pure silica not containing impurities such as Fe, Ni, Cr, Al and Ti in addition to uranium for use as starting materials for multi-ingredient optical fibers, fine ceramics, optical glasses, quartzs for use in electronic industry, as well as to silica for sealing use.

As a process for producing synthetic silica of high purity serving to such application uses, there has been proposed a method of adding an inorganic acid or an organic acid to an aqueous alkali silicate solution or bringing an aqueous alkali silicate solution into contact with an ion exchange resin thereby preparing an acidic silica sol (Japanese Patent Laid Open No. 42217/85), purifying the acidic silica sol by using a cationic exchange resin, adding aqueous ammonia thereto to prepare a neutral or weakly alkaline silica sol, then mixing the sol and an aqueous ammonium salt solution under an alkaline condition to crystallize precipitated silica, recoverying the same by separation and synthesizing silica of high purity.

However, the synthetic silica obtained by the conventional method involves a drawback in that it still contains residual Ti at high ratio although Fe, Al, Th, U, Na, etc. are removed favorably and, accordingly, results in a problem that the residual Ti absorbs light and reduces the light transmittance, for example, where it is used in multi-ingredient optical fibers.

The present inventor has made an earnest study for such a cause and found that although those ions carrying positive charges such as Fe, Al, Th, U, Na are properly removed through ion exchange upon purifying the acidic silica sol by using a cationic exchange resin in the conventional method, Ti in the form of tetravalent metal ions like that of Si exhibits natures similar with those of Si and remains in a great amount in the acidic silica sol, and not being removed by the cationic exchange resin.

SUMMARY OF THE INVENTION

This invention has been devised in view of the foregoing and the subject thereof is to provide a process for producing silica of high purity not containing Ti.

That is, this invention concerns a process for producing silica of high purity, which comprises preparing an acidic silica sol from an aqueous solution of alkali silicate through a hydrogen peroxide treatment, adjusting the acidic silica sol to pH 0–5, purifying the acidic silica sol after the pH adjustment by using a cationic exchange resin, neutralizing the thus purified acidic silica sol to prepare a silica sol and preparing silica from the silica sol.

In such technical means, it is possible to use an aqueous solution of commercially available sodium silicate, potassium silicate etc. usually containing from 20 to 35% by weight of $SiO_2$ as the alkali silicate for the starting material of the acidic silica sol.

However, $Fe_2O_3$, $Al_2O_3$, etc. are present as impurities in the aqueous solution, most of which are present in the form of ions in solution and, in addition, very fine insoluble particles of hydroxides or silicates are sometimes present in the colloidal form, etc. Accordingly, it is desirable to apply purifying procedures prior to the synthesis of the acidic silica sol such as by usual filtration, microfiltration, ultrafiltration, coprecipitation removal with a desired adsorbent or the combination thereof. Further, upon preparing an acidic silica sol from the aqueous solution of the alkali silicate, the aqueous solution as described above is usually used after dilution to a concentration of 2–7% by weight of $SiO_2$.

Then, upon preparing the acidic silica sol from the aqueous solution of the alkali silicate, the alkali silicate is brought into reaction with an inorganic acid or an organic acid silica. The alkali silicate may be dropped into the inorganic acid or the organic acid for reaction or, alternatively, the inorganic acid or the organic acid may be added to the alkali silicate for reaction. In the case of adding the inorganic acid or the organic acid to the alkali silicate for reaction, if the adding speed is slow, the acidic silica sol formed sometimes becomes unstable and gels under the alkaline atmosphere. Thus, instantaneous addition is desirable. Further, it is desirable to uniformly agitate the reaction solution upon addition so that pH does not vary in the reaction solution. Furthermore, hydrochloric acid, sulfuric acid, nitric acid, etc. are usable as the inorganic acid, while formic acid, acetic acid, oxalic acid, etc. are usable as organic acid in this invention.

In addition, a method of bringing the aqueous solution of alkali silicate in contact with a strongly acidic cationic exchange resin may be employed as a method of preparing the acidic silica sol.

Aqueous hydrogen peroxide is then added to the thus obtained acidic solution to conduct a hydrogen peroxide treatment. In this case, aqueous hydrogen peroxide for electronic industrial use not containing impurities is desirably used. Further, while the hydrogen peroxide treatment is usually applied after the preparation of the acidic silica sol, in the case of adopting an alternative method of reacting the aqueous solution of alkali silicate with the acidic solution of the inorganic acid or organic acid to prepare the acidic silica sol, the aqueous hydrogen peroxide may be added to the aqueous solution of alkali silicate or acidic solution and to conduct the hydrogen peroxide treatment before the preparation of the acidic silica sol. By the hydrogen peroxide treatment, Ti in the acidic silica sol forms a compound with the hydrogen peroxide as shown by the following reaction scheme, by which the nature thereof is made different from that of Si. As a result, Ti changes its nature such that it can be exchanged easily with the cationic exchange resin and removed in the same manner as Fe, Al, Th, U, Na, etc.

$$Ti^{4+} + H_2O_2 \rightarrow Ti(H_2O_2)^{4+}$$

The concentration of hydrogen peroxide during the hydrogen peroxide treatment is desirably higher than 0.05% by weight and, preferably, higher than 0.1% by weight based on the acidic silica sol after preparation considering the reaction rate between Ti and hydrogen peroxide. Further, in the case of applying the hydrogen peroxide treatment before preparation of the acidic silica sol, it is higher than 0.05% by weight and, preferably, higher than 0.1% by weight based on the total weight of the aqueous solution of alkali silicate and acidic solution due to the same reason.

While on the other hand, if the concentration of hydrogen peroxide in the hydrogen peroxide treatment exceeds 1.0% by weight, gas bubbles are evolved in the column in the purifying step described next, which hinder the contact between the cationic exchange resin and the acidic silica sol in the column, to reduce the exchanging capability of the cationic exchange resin thereby taking much time for the purification step of the acidic silica sol and, accordingly, the concentration of hydrogen peroxide is desirably lower than 1.0% by weight.

Then, for converting the acidic silica sol into a non-gelling stable sol, the acidic silica sol, after pH adjustment 0-5 by the addition of sodium hydroxide, potassium hydroxide, etc., is poured into a column filled with cationic exchange resins for purification to remove impurities contained in the silica sol such as Fe, Al, Th, U, Na, Ti, etc, resulting in an acidic silica sol of high purity.

Then, silica powder of high purity is obtained from the thus purified acidic silica sol by the usual method discussed below. That is, an aqueous alkali solution such as of sodium hydroxide is added to the acidic silica sol for neutralization to prepare a neutral or weakly alkaline silica sol, and the neutral or weakly alkaline silica sol is added to an aqueous solution of ammonium salt adjusted to pH 8-9 with a pH controller to obtain silica precipitates. In this case, as the ammonium salt mentioned above, there can be used an inorganic acid salt of ammonium such as ammonium chloride, ammonium nitrate, ammonium carbonate and ammonium sulfate, or an organic acid salt of ammonium such as ammonium formate, ammonium acetate and ammonium oxalate.

Then, the precipitates are separated by filtration, washed with water and then with acid, separated by filtration again and washed with water to obtain filter cakes of silica. Then, after drying the cakes, heat treatment is applied at a temperature of about 1000° C. in an electric furnace to obtain silica powder of high purity.

In this way, according to this invention, since the acidic silica sol treated with hydrogen peroxide is purified with the cationic exchange resin and the adsorption performance through ion exchange of Ti contained in the acidic silica sol to the exchange resin is increased, Ti can be removed from the acidic silica sol to the same extent as those impurities such as Fe, Al.

Accordingly, since the purity can thus be improved, the silica can be used as the starting material for fillers in the resin composition for sealing electronic components, and as starting material of multi-ingredient optical fibers, fine ceramics, optical glasses and quartz for use in the electronic industry.

DETAILED DESCRIPTION OF THE PREFERRED EMBODIMENT

The process according to this invention will now be described specifically referring to examples and comparative examples.

EXAMPLE 1

Commercially available JIS No. 3 aqueous solution of sodium silicate was used as a starting solution after dilution to 11% by weight of $SiO_2$ and filtration through a microfilter. While on the other hand, an acidic solution was prepared by charging 2500 ml of water and 325 ml of an aqueous 35% hydrogen chloride solution into a reaction vessel and 2500 ml of the starting solution were added under stirring into the acidic solution for about one hour by using a pump to prepare an acidic silica sol. Then, 25 ml of 30% aqueous hydrogen peroxide for electronic industrial use was added to the acidic silica sol to apply a hydrogen peroxide treatment and then pH was adjusted to 1.0 by adding an aqueous 50% sodium hydroxide solution to prepare a stable acidic silica sol.

Then, for removing impurities from the acidic silica sol, the acidic silica sol was caused to flow at a flow rate of 12 ml/min into a column filled with H type strongly acidic cationic exchange resin (trade name Diaion SK112: manufactured by Mitsubishi Kasei Industry Co.) (50 mm inner diameter, 870 mm length; the resin charging amount: 1.7 liter) to obtain an acidic silica sol of high purity.

Then, highly pure silica powder was obtained from the acidic sol by the usual method shown below. That is, 4 liter of an aqueous 28% sodium hydroxide solution were added to 20 liter of the acidic silica sol for neutralization to prepare a neutral or weakly alkaline silica sol (pH 9.0), and silica was precipitated by adding the neutral or weakly alkaline silica sol to 16 liter of an aqueous 14% ammonium chloride solution with pH adjusted to 8.5-9.0 by aqueous ammonium while stirring the aqueous solution for about one hour. Then, the precipitates were separated by filtration, washed with water, washed with acid for two hours using an aqueous 5% hydrochloric acid solution at about 80° C., separated through filtration again and washed with water to obtain silica filter cakes. After drying the cakes at 300° C., they were heat treated at a temperature of about 1000° C. in an electric furnace to obtain silica powder of high purity.

EXAMPLE 2

2500 ml of the starting solution of sodium silicate used in Example 1 and 2500 ml of water were charged in a reactor vessel, to which 325 ml of an aqueous 35% hydrochloride acid solution were added instantaneously under stirring to prepare an acidic silica sol.

Then, after applying a hydrogen peroxide treatment by adding 25 ml of an aqueous 30% hydrogen peroxide to the silica sol, pH was adjusted with 1.0 by the addition of an aqueous 50% sodium hydroxide solution to prepare a stable acidic silica sol. Then, acidic silica sol and silica powder of high purity were obtained by the same procedures as in Example 1.

EXAMPLE 3

2500 ml of the starting solution of sodium silicate used in example 1, 2500 ml of water and 25 ml of an aqueous 30% of hydrogen peroxide were charged in a reaction vessel, to which 325 ml of an aqueous 35% hydrochloric acid solution were added instantaneously under stirring to prepare an acidic silica sol applied with the hydrogen peroxide treatment.

Then, an aqueous 50% solution of sodium hydroxide was added to the acidic silica sol to adjust pH to 1.0 to prepare a stable acidic silica sol. Then, acidic silica sol and silica powder of high purity were obtained in the same procedures as in Example 1.

EXAMPLE 4

The starting solution of sodium silicate used in Example 1 was diluted to 3% by weight of $SiO_2$ and 2500 ml of sodium silicate solution was caused to flow in a column filled with the H type strongly acidic cationic exchange resin (Diaion SK112) at a flow rate of 20 ml/min to prepare an acidic silica sol. Then, an aqueous 35% solution of hydrochloric acid was added to the silica sol to adjust pH to 1.0 and then 25 ml of an aqueous 30% hydrogen peroxide were added to apply a hydrogen peroxide treatment to prepare a stable acidic silica sol.

Then, the acidic silica sol is caused to flow into a column filled with the H type strongly acidic cationic exchange resins to obtain an acidic silica sol of high purity and silica powder of high purity was obtained from the silica sol in the same procedures as in Example 1.

Comparative Example

Acidic silica sol and silica powder were prepared in the same procedures as in Example 1 except for not adding 25 ml of an aqueous 30% hydrogen solution to the acidic sol prepared from the aqueous solution of sodium silicate and the acidic solution.

Then, the impurity concentrations contained in the silica sols obtained in Examples 1-4 and the Comparative Example, as well as the impurity concentrations contained in the silica powders obtained in Example 1-4 and the Comparative Example, were determined by ICP Emission Spectrochemical Analysis.

The results are shown in the following Tables 1 and 2. In the tables, the impurity concentration in the acidic silica sol in Table 1 were obtained by sampling the acidic silica sol obtained after chromatographing the sol through a column partially filled with cationic exchange resin and fractionating the eluate obtained at 2, 3, 4 and 5 liters. The Table shows the concentration of trace metals in each cut.

TABLE 1

| | | Impurity concentration in acidic silica sol (ppm) | | | | |
|---|---|---|---|---|---|---|
| | | Ti | Fe | Al | Ni | Cr |
| Example 1 | 2 l pass | 0.2 | 0.3 | <0.1 | <0.1 | <0.1 |
| | 3 l pass | 0.2 | 0.3 | <0.1 | <0.1 | <0.1 |
| | 4 l pass | 0.1 | 0.3 | <0.1 | <0.1 | <0.1 |
| | 5 l pass | 0.1 | 0.3 | <0.1 | <0.1 | <0.1 |
| Example 2 | 2 l pass | 0.2 | 0.2 | <0.1 | <0.1 | <0.1 |
| | 3 l pass | 0.2 | 0.2 | <0.1 | <0.1 | <0.1 |
| | 4 l pass | 0.2 | 0.3 | <0.1 | <0.1 | <0.1 |
| | 5 l pass | 0.1 | 0.3 | <0.1 | <0.1 | <0.1 |
| Example 3 | 2 l pass | 0.2 | 0.2 | <0.1 | <0.1 | <0.1 |
| | 3 l pass | 0.2 | 0.2 | <0.1 | <0.1 | <0.1 |
| | 4 l pass | 0.2 | 0.3 | <0.1 | <0.1 | <0.1 |
| | 5 l pass | 0.1 | 0.3 | <0.1 | <0.1 | <0.1 |

TABLE 1-continued

| | | Impurity concentration in acidic silica sol (ppm) | | | | |
|---|---|---|---|---|---|---|
| | | Ti | Fe | Al | Ni | Cr |
| Example 4 | 2 l pass | 0.1 | 0.1 | <0.1 | <0.1 | <0.1 |
| | 3 l pass | 0.1 | 0.1 | <0.1 | <0.1 | <0.1 |
| | 4 l pass | 0.1 | 0.2 | <0.1 | <0.1 | <0.1 |
| | 5 l pass | 0.1 | 0.2 | <0.1 | <0.1 | <0.1 |
| Comparative Example | 2 l pass | 0.3 | 0.3 | <0.1 | <0.1 | <0.1 |
| | 3 l pass | 0.3 | 0.3 | <0.1 | <0.1 | <0.1 |
| | 4 l pass | 1.5 | 0.3 | <0.1 | <0.1 | <0.1 |
| | 5 l pass | 2.3 | 0.3 | <0.1 | <0.1 | <0.1 |

TABLE 2

| | Impurity concentration in acidic silica powder (ppm) | | | | | |
|---|---|---|---|---|---|---|
| | Ti | Fe | Al | Ni | Cr | U (ppb) |
| Example 1 | 0.3 | 0.1 | 0.2 | <0.1 | <0.1 | <0.1 |
| Example 2 | 0.5 | 0.2 | 0.2 | <0.1 | <0.1 | <0.1 |
| Example 3 | 0.5 | 0.2 | 0.2 | <0.1 | <0.1 | <0.1 |
| Example 4 | 1.2 | 0.4 | 0.8 | <0.1 | <0.1 | 0.1 |
| Comparative Example | 75 | 0.4 | 0.3 | 0.1 | 0.1 | 0.1 |

As is apparent from Tables 1 and 2, it was confirmed that the reduction in the concentration of Ti, Fe, Al, Ni, Cr and U in the silica sols and silica powders obtained by Examples 1-4 was remarkable, and it was particularly significant with respect to Ti.

While on the other hand, substantially the same results as in Examples 1-4 were obtained for impurities other than the Ti in the silica sol and silica powder prepared by the Comparative Example.

According to the method of the present invention, it is possible to remove impurities such as Al, Fe and, in addition, Ti which was difficult to be removed by the conventional method and it can provide an effect of easily preparing synthetic silica of high purity used as fillers for sealing electronic components, and as starting material for multi-ingredient optical fibers, fine ceramics, optical glasses and quartz for the electronic industry.

What is claimed is:

1. A process for producing silica having a Ti impurity concentration of 0.3 to 1.2 ppm. comprising:
   (a) preparing an acidic silica sol from an aqueous solution of an alkali silicate by reacting an aqueous solution of an alkali silicate with an inorganic acid, an organic acid or by contacting an aqueous solution of the alkali silicate with a strongly acidic cation exchange resin to form an acidic silicate sol composition;
   (b) treating said acidic silicate sol composition with hydrogen peroxide;
   (c) adjusting the pH of the aqueous sol composition to 0 to 5 by addition of a base selected from the group consisting of sodium hydroxide and potassium hydroxide;
   (d) purifying the silica sol obtained by pH adjustment by contacting the acidic silica sol with a cationic ion exchange resin to obtain a silica sol having an Ti impurity level of 0.3 to 1.2 ppm.;
   (e) neutralizing the silica sol with an aqueous alkali solution;
   (f) adding the neutralized silica sol to an aqueous solution of ammonium salt; and
   (g) separating the precipitated silica.

2. A process as defined in claim 1, wherein the hydrogen peroxide is introduced by adding aqueous hydrogen peroxide into the acidic silica sol.

3. A process as defined in claim 2, wherein the concentration of aqueous hydrogen peroxide is from 0.05% by weight to 1.0% by weight based on the acidic silica sol.

4. A process as defined in claim 1, wherein the acidic silica sol is prepared by dropping an aqueous solution of the alkali silicate into an acidic solution of an inorganic acid or an organic acid while stirring said acidic solution.

5. A process as defined in claim 4, wherein the hydrogen peroxide is introduced by adding the aqueous hydrogen peroxide to the aqueous solution of alkali silicate.

6. A process as defined in claim 4, wherein the hydrogen peroxide is introduced by adding aqueous hydrogen peroxide to the acidic solution of the inorganic acid or organic acid.

7. A process as defined in claim 5 or 6, wherein aqueous concentration of the hydrogen peroxide is from 0.05% by weight to 1.0% by weight based on the total weight of the aqueous solution of alkali silicate or the acidic solution.

8. A process as defined in claim 1, wherein the acidic silica sol is prepared by adding the acidic solution of the inorganic acid or organic acid into the aqueous solution of alkali silicate while stirring the solution.

9. A process as defined in claim 8, wherein the hydrogen peroxide is introduced by adding aqueous hydrogen peroxide to the aqueous solution of alkali silicate.

10. A process as defined in claim 8, wherein the hydrogen peroxide is introduced by adding aqueous hydrogen peroxide to the acidic solution of the inorganic acid or organic acid.

11. A method as defined in claim 9 or 10, wherein the concentration of aqueous hydrogen peroxide is from 0.05% by weight to 1.0% by weight based on the total weight of the aqueous solution of alkali silicate or the acidic solution.

12. A process as defined in claim 1, wherein the acidic silica sol is purified to the extend that there exists a Ti impurity concentration range of 0.1 to 0.2 ppm Ti.

* * * * *